United States Patent Office 3,487,682
Patented Jan. 6, 1970

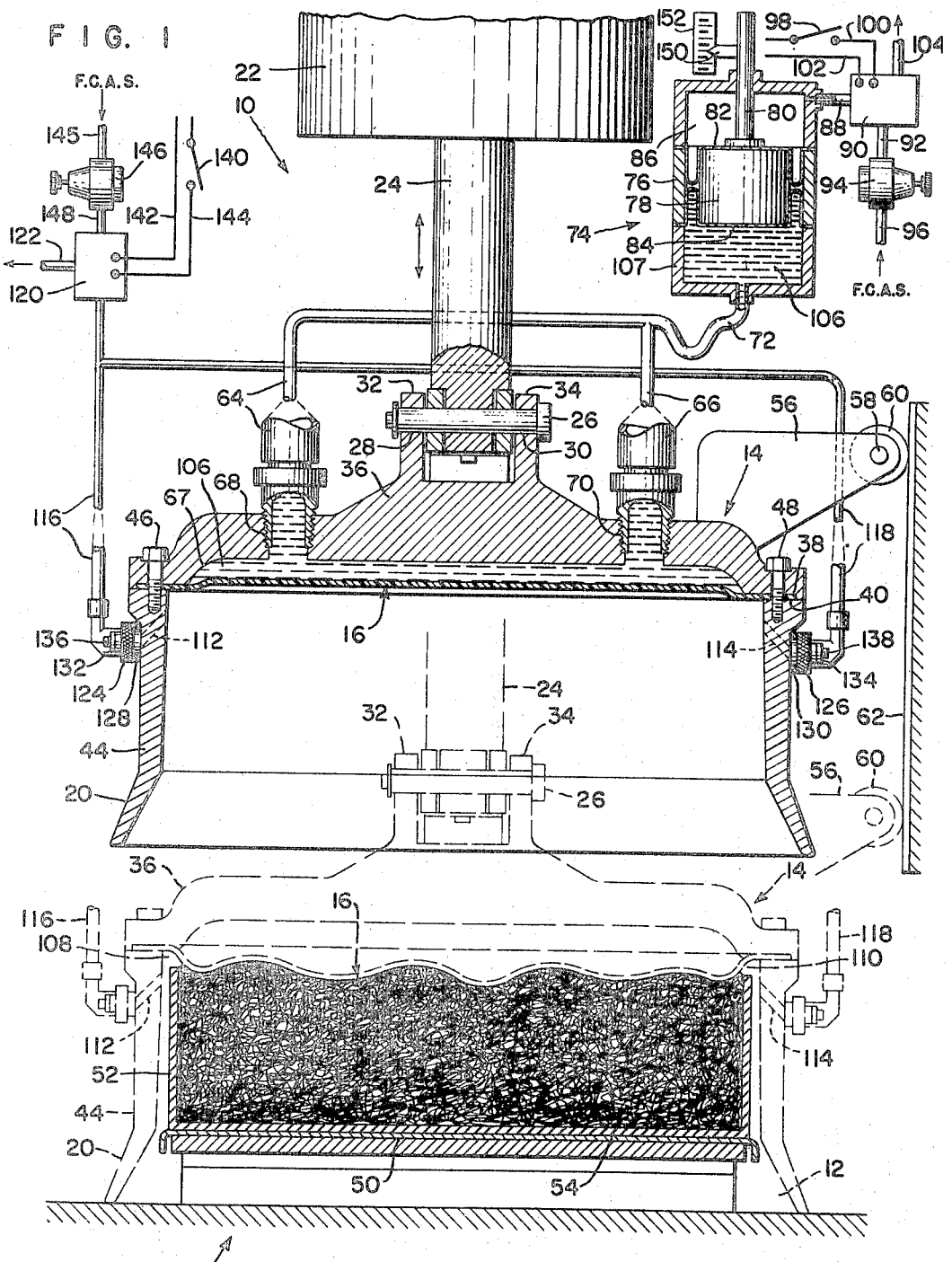

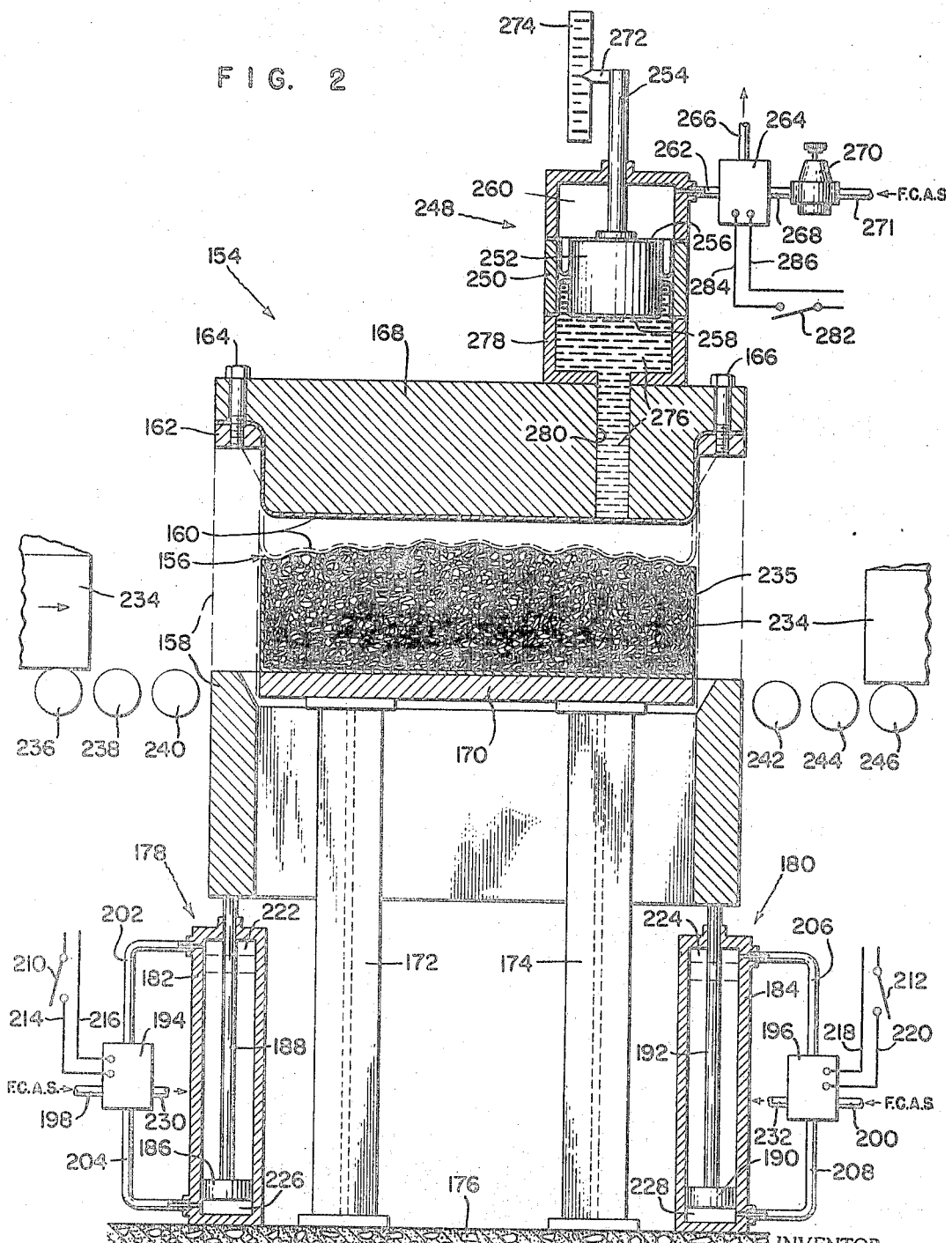

3,487,682
MEASURING APPARATUS
Robert C. Whitehead, Jr., Oreland, Pa., assignor to Honeywell Inc., Minneapolis, Minn., a corporation of Delaware
Filed Dec. 26, 1967, Ser. No. 693,480
Int. Cl. G01f 17/00
U.S. Cl. 73—149                                   5 Claims

ABSTRACT OF THE DISCLOSURE

An apparatus to accurately measure the volume of a deformable material having a chamber wall constructed to form a fixed volume about the material, a flexible member forming an internal wall of the chamber, a power actuator to apply a liquid under a preselected pressure to one side of the flexible member to uniformly compress the material into a compact state and an indicator operably connected for movement with the power actuator to measure the volume of the material in terms of the volume of liquid applied to the flexible member.

---

It is an object of the present invention to disclose an apparatus that will accurately measure the volume of deformable materials that are of any one of a number of different sizes and shapes.

More specifically it is another object of the present invention to disclose an apparatus of the aforementioned type that is particularly useful in measuring the value of any deformable material such as animal tissue, viscous slurries and other moldable materials.

It is another object of the present invention to provide an apparatus that will save packaging time by simultaneously applying uniform pressure to a deformable material in a carton as it accurately measures the volume of this material.

More specifically it is another object of the invention to disclose an apparatus for slidably moving the flared edge of an inverted rectangular cup shaped member, containing a slack diaphragm in its inner closed end portion, about a carton filled with a material whose volume is to be measured and into contact with a stationary base member to establish a fixed volume in which a liquid under pressure can be applied to the slack diaphragm to compress the product uniformly in its carton so that the volume of the product can be measured in terms of the amount of liquid under pressure that is required to be applied within the cup shaped member to compress the slack diaphragm.

It is another object of the present invention to provide a modified form of the aforementioned volume measuring apparatus in which (a) a table is employed to support the deformable material in a carton (b) a rigid sleeve is raised from a position below and outside the periphery of the table top to a position that is above the table top and which surrounds the carton supported thereon to define a limited fixed volume in which compression of the material in the carton can take place and (c) the pressure of a liquid is employed to inflate a diaphragm whose periphery is fixed to a stationary wall to uniformly compress the material in a direction against the sides and toward the base of the carton.

It is another object of the present invention to disclose a regulating unit to release the pressure of the liquid acting on the previously mentioned flexible member after a volume measurement is made in order to place the apparatus in a condition to take a subsequent volume measurement.

It is another object of the invention to disclose a valve means associated with a pressurized air supply and an atmospheric exhaust port to enable air that is entrained in the material to be exhausted through an exhaust port during the time in which the material is being compressed to a compacted state and to apply air under pressure to the underside surface of the diaphragm to separate the diaphragm from the material after the material has been placed in its previously mentioned compacted state.

It is another object of the present invention to employ a power actuator of the aforementioned type that has a smaller cross section area than the flexible member employed to compress the material to thereby enable a volume indicating rod and pointer connected for movement with this power actuator to act as a motion amplifier during changes in the position of the flexible member in contact with the material that occur as the material is compressed to a compact state.

A better understanding of the present invention may be had from the following detailed description when read in connection with the accompanying drawing in which:

FIGURE 1 shows one form of the aforementioned volume measuring apparatus and

FIGURE 2 shows a preferred form of the volume measuring apparatus.

The volume measuring apparatus 10 shown in FIGURE 1 is comprised of a chamber 12 of a fixed volume formed by a rectangular shaped hood 14, a slack flexible wall 16 in the form of a diaphragm forming an internal wall of the rectangular hood 14 and a stationary support member 18 against which an open flared end 20 of the hood 14 is engageable.

The volume apparatus 10 of FIGURE 1 is also comprised of a hydraulic ram 22 which may be of any well known commercially available type. This hydraulically operated ram 22 is shown having a piston rod 24 connected by way of one or more pin and slotted wall connections 26, 28, 30 formed in the lugs 32, 34 located on the top portion 36 of the rectangular hood member 14. The top portion of the hood 36 and the slack diaphragm 16 are preferably made of a rectangular shape and are joined together in fluid tight sealed engagement along the respective peripheral surfaces 38, 40 to the bottom portion 44 of hood 14 by means of a suitable number of spaced apart tap bolt connecting means 46, 48.

The stationary support member 18 against which the hydraulic ram and piston 22, 24 move the flared end of hood 14 as shown in dash line form in FIGURE 1 is shown having a table 50 fixed thereto to support a carton 52 that contains a deformable material 54, such as meat, which volume is to be measured.

The top portion of the hood 36 shown in FIGURE 1 has the lower left end portion of a guide plate 56 fixedly attached thereto.

The right end of the plate 56 is shown supporting a rotatable shaft 58 thereon that in turn has a roller member 60 rotatably mounted thereon for rolling along a stationary guide bar 62. The guide plate 56, roller 60 and guide bar 62 thus provide a reference surface along which the hood 44 can be lowered down over and raised away from the exterior of the carton of deformable material 54 whose volume is to be measured.

A pair of flexible conduits 64, 66 are shown in FIGURE 1 in threaded fluid tight engagement at 68, 70 at one of each of their respective ends and shown connected by a common branch conduit 72 associated with each of the conduit 64, 66 to a double acting regulating unit 74. The regulating unit 74 is comprised of a cylinder 76, a piston 78 and a piston rod 80 attached to its upper end. The piston 78 has slack diaphragms 82, 84 on its upper and bottom surface and the peripheral portions of these diaphragms 82, 84 are fixedly connected in any suitable manner to the wall forming the cylinder 76.

The top chamber 86 of the cylinder housing has a conduit 88 extending therefrom through a solenoid regulator valve 90 which in turn is connected by way of conduit 92, the pressure regulator 94 and conduit 96 to a filtered compressed air supply FCAS.

The solenoid valve 90 has a normally opened switch 98 attached thereto by way of the conductors 100, 102 to allow any air under pressure in chamber 86 to escape to the atmosphere by way of the conduits 88, solenoid 90 and vent 104.

After the hydraulic ram 22, and piston 24 and the pin 26 have moved the hood 44 from its solid line position to its dash line position against the stationary wall member 18 the switch 98 of the regulator unit 74 is then closed to cut off the vent 104 and allow air under a preselected pressure set by regulator 94 to pass from the regulator 94 through conduit 92, valve 90, conduit 88, and to be applied to chamber 86 to move the top diaphragm 82, piston 78 and lower diaphragm 84 in a downward direction. This action will compress the liquid 106 and force it out of the lower chamber 107, through conduit 72, 64, 66 into the chamber 67 formed between the slack flexible diaphragm member and the upper wall 36 of the hood 14. When this occurs the flexible diaphragm member 16 will be moved into its wavy dashed line contact position with the top surface of the deformable material 54 to compress it into a compact state.

While the aforementioned compaction of the material 54 is taking place any voids or entrained air contained therein will be allowed to pass out through the areas e.g. 108, 110 between the diaphragm 16 and the upper edge of the carton 52 and escape by way of passageways 112, 114 and their associated conduits 116, 118, solenoid valve 120 through vent 122 to atmosphere.

Each of the external walls of the lower end of conduits 116, 118 contain a flange 124, 126. Each of these flanges 124, 126 are compressed against ring shaped seals 128, 130 by rotating their respective threaded nut members 132, 134 on their associated threaded studs 136, 138, that have threaded inner ends that protrude into the bottom hood portion 44.

The conduits 116 and 118 can also be quickly disconnected by threadedly removing the nut members 132, 134 from their associated studs 136, 138.

The solenoid valve 120 has a normally opened switch 140 connected thereto by means of the connectors 142, 144 to allow air in voids and entrained air in the deformable material to be vented to atmosphere in the same manner and for the reasons previously explained.

Immediately after the hood 44 has been moved from its solid to its dash lined position and the flexible diaphragm member 16 has been moved from its solid to its dash line position to compress the deformable material 54, the switch 140 is closed, the vent 122 closes and air under pressure is allowed to be applied from a filtered compressed air supply FCAS to flow through conduit 145, pressure regulator 146, conduit 148 solenoid valve 120, conduits 116, 118 and their associated passageways 112, 114 through the areas 108, 110 located between the diaphragm 16 and top surface of the deformable material 54. This air under pressure will thus prevent any of the deformable material 54 from clinging to the underside of the flexible diaphragm member 16. This action takes place before the hydraulic ram and its rod 22, 24 raises the hood 14 and its associated diaphragm 16 upwardly to their solid line positions and away from the deformable material 54.

The sequence in which the aforementioned operation of the volume measuring apparatus takes place is as follows:

First a carton of the deformable material 52 is moved onto the table 50 while the hood 14 is in its solid position. The hydraulic ram and ram rod 22, 24 associated therewith is energized in a conventional manner to force the hood 14 to roll downward by means of its roller 60 into contact with a stationary support member 18 forming one wall of a chamber of fixed volume about the deformable material 54. The switch 98 is closed and air under a preselected regulator pressure enters chamber 86 to move the piston 78 downward and force the liquid 106 under pressure out of the lower chamber of the double acting regulator unit 74 through the flexible conduit 72, 64, 66. In this way the liquid 106 is applied to the chamber 67 formed between the top portion 36 of the hood 14 and the flexible diaphragm member 16 to move this diaphragm from its solid line position to its wavey dash line position to compress the deformable material 54 unto a compact condition.

While the aforemtioned compaction of the deformable material is taking place the switch 140 is opened and air in voids and entrained air in the deformable material is exhausted by way of conduit 116, 118, solenoid valve 120 and conduit 122 to atmospheric pressure. As the liquid 106 is transferred from the double acting regulator unit 74 to the chamber 67 between the hood part 36 and the diaphragm 16 the pointer 150 that is fixed for movement with the piston rod 80 of the unit 74 will also be moved in a downward direction along a scale 152.

The volume of the deformable material 54 indicated on the scale 152 to which the pointer 150 is directed is calibrated in terms of the amount of liquid 106 that has been required to be moved into the previously referred to chamber 12 of fixed volume formed about the deformable material 54.

After the liquid actuated flexible diaphragm member 16 has completed the compression of the deformable material 54 to a preselected compact condition against the sides and bottoms of the deflectable carton 52 and a volume reading has been noted on the scale 152 opposite pointer 150 the switch 98 is then opened. Opening of the switch 98 will effect an axhaustion of air under pressure from chamber 86, conduit 88, solenoid valve 90 and vent 104 to atmospheric pressure. This will relieve the pressure being applied to the liquid 106 acting on the flexible member 16 and will permit the simultaneous contraction of the expanded condition of the resilient diaphragm member 16 shown in dash line form back to its normal nonexpanded condition shown in solid line form.

It is to be noted that I prefer to make the flexible member 16 of any stretchable material such as rubber or plastic material such as polyurethane or silicone rubber which can undergo extensive stretching without losing its resilience.

When the aforementioned transfer of liquid has been completed the switch 140 is closed to allow air under a regulated pressure to flow from a filtered compressed air source FCAS, conduit 148, solenoid valve 120, conduits 116, 112 and 118, 114 to separate any deformable material 54 that may per chance stick to the flexible member 16. Furthermore, while this diaphragm cleaning action is taking place the hydraulic ram 22 and hood 14 is raised from its dash line position to its solid line position.

Description (FIG. 2)

FIGURE 2 shows the preferred form of the volume measuring apparatus 154 as comprising a chamber 156 of a fixed volume formed by a wall of a sleeve shaped configuration 158, a flexible member in the form of a diaphragm 160 attached to its periphery by means of a ring 162 and a suitable number of tap bolts 164, 166 to the underside surface of a stationary wall 168 forming the top wall of the chamber 156. A stationary table 170 forming a base of the chamber is supported by the beam type support members 172, 174 on a foundation 176.

The volume measuring apparatus 154 is also comprised of a pair of double acting power cylinder units 178, 180. The respective units 178, 180 are each comprised of a cylinder 182, 184, a unitary piston and piston rod 186, 188, 190, 192 fixedly connected for movement with the sleeve 158, three way solenoid valves 194, 196, inlet conduit 198, 200, double purpose inlet and exhaust conduits 202, 204, 206, 208 and switches 210, 212 which are operably connected by conductors 214, 216, 218, 220 to control their associated valves 194, 196.

When the switches 210 and 212 are open, air from a filtered compressed air supply FCAS will flow by way of their associated conduits 198, 200 through the solenoid valves 194, 196, conduits 202, 206 into the top chamber 222, 224 of their associated cylinders 182, 184 to move the pistons 186, 190 and sleeve 158 in a downward direction.

While the aforementioned action takes place the air under pressure in the chambers 222, 224 will be exhausted by way of the conduits 204 and 208 their associated valves 194, 196 and their associated vents 230, 232 to atmospheric pressure.

When the switches 210, 212 are closed, air from the compressed filtered air supply FCAS will flow by way of their associated conduits 198, 200 to the solenoid valves 194, 196, conduits 204, 208 into the bottom chambers 226, 228 of their associated cylinders 182, 184 to move the pistons 186, 190 and sleeve 158 in an upward direction.

While the aforementioned action takes place the air under pressure in the chambers 222, 224 will be exhausted by way of conduits 202 and 206 through valves 194, 196 and their associated vents 230, 232 to atmospheric pressure.

The table 170 supported by beams 172, 174 provides a convenient means for receiving and supporting a carton, for example carton 234, filled with a deformable material 235 for taking a volume measurement as each of a series of cartons are rolled along the assembly line rollers 236, 238, 240, 242, 244, 246 from one of the shown positions of one of the cartons on the rollers to another.

A double acting regulating unit 248 is fixedly connected to the upper surface of the stationary wall 168 and is comprised of a cylinder 250, a piston 252, piston rod 254, diaphragms 256, and 258, a top chamber 260, a conduit 262, a solenoid regulated valve 264, a vent 266, conduit 268, a pressure regulator 270 and a conduit 271 connected to a filtered compressed air supply FCAS, the pointer 272 and an indicating scale 274 are similar to and function in the same manner as the parts bearing the same names that were previously set forth under the description of FIGURE 1.

Liquid 276 is shown located in the lower chamber 278 of the cylinder 250 and in passageway 280 formed in wall 168.

When a switch 282 associated by way of conductors 284, 286 with solenoid valve 268 is open, chamber 260 is vented to atmospheric pressure by way of vent 266 and the diaphragm is in a tight partially stretched position as shown in solid line form in FIGURE 2 on the lower surface of wall 168.

When the switch 282 is closed the vent 266 associated with solenoid valve 264 will be closed and air under pressure will be applied from a filter compressed air supply source FCAS by way of conduit 271, regulator 270, conduit 268, solenoid valve 264 and conduit 262 to chamber 260. The pressure of the liquid in chamber 260 will cause the slack diaphragms 256, 258 and piston 252 to move in a downward direction and a quantity of the liquid 276 in chamber 278 will thereby be forced through passageway 280 into the space between the solid line portion of the flexible member 160 and the stationary wall 168. This action will cause the flexible member 160 to expand in a downward direction against the deformable material 235 to compress it into a compact state against side wall and base of the carton 234.

When the switch 282 is open the air under pressure being applied to the chamber 260 will be vented to atmospheric pressure by way of conduit 262, solenoid valve 264, vent 266 and the pressure of the fluid 276 acting on the flexible member 160 will decrease and allow the stretched flexible member 160 to return from its stretched dash line position to its solid line position against wall 168.

Operation (FIG. 2)

The sequence in which the aforementioned operations of the volume measuring apparatus takes place are as follows:

The carton 234 shown in dotted line form at the left side of FIG. 2 containing a deformable material 235 whose volume is to be measured is moved into its solid line position on top of the table 170 while the sleeve 158 is in its lowered solid line position.

The switches 210, 212 are closed causing the sleeve 158 to be forced upwardly by the power regulator unit 178, 180 from its solid to its dotted line position. In this raised position it can be seen that a fixed volume 156 is formed by the sleeve 158, tabletop 170 and the flexible diaphragm member 160 that is in snug contact with the wall 168.

The switch 282 is then closed to allow air under the fixed pressure to be applied to chamber 260 to move the piston 252 and the slack diaphragms 256, 258 downward and force liquid 276 into the space between the flexible diaphragm member 160 and the wall 168. This action will cause the flexible member 160 to expand and compress the deformable material 235 into a compact state against the sides and bottoms of the carton 234.

When the deformable material 235 is completely compressed and the pointer 272 stops moving in a downward, increased volume direction, the volume of the deformable material 235 can then be read from the indication opposite the pointer 272 on the scale 274.

The chamber 260 is then vented to atmosphere by way of conduit 262, solenoid valve 264 and vent 260. This will allow the flexible diaphragm member 160 to force the liquid back into the chamber 276 because of the inherent resilient nature that causes this flexible member 160 to contract from its dash line stretched position.

The switches 210 and 212 are then opened to allow the power cylinder units 178, 180 to lower the sleeve 158 from its dash line position to its solid line position. The carton 234 containing the deformable material 235 is then moved to the right of the position shown in FIGURE 2 along rollers 242, 244, 246 for additional processing operations such as labeling etc. and another carton is rolled off of the rollers 236, 238, 240, onto the table 170 where another volume measurement similar to that just described can be completed.

The embodiments of the invention in which an exclusive property or privilege is claimed are defined as follows:

1. An apparatus to measure the volume of a deformable material while a uniform pressure is being applied to the material, comprising a chamber, said chamber having walls defining a fixed volume adapted to receive said material, a flexible member forming an internal wall of the chamber adjacent the material, means for applying a fluid under a preselected pressure to one side of the flexible member to bring the flexible member into compressible contact with the material to uniformly compress the material into a compact state, an indicator operably connected for movement with said fluid applying means to measure the volume of the material in terms of volume of fluid applied to the flexible member and wherein one of the chamber walls is constructed of a rectangular shaped configuration and is operably connected for sliding down and about the periphery of a carton containing the material within the said chamber.

2. An apparatus to measure the volume of a deformable material while a uniform pressure is being applied to the material, comprising a chamber, said chamber having walls defining a fixed volume adapted to receive said material, a flexible member forming an internal wall of the chamber adjacent the material, means for applying a fluid under a preselected pressure to one side of the flexible member to bring the flexible member into compressible contact with the material to uniformly compress the material into a compact state, an indicator operably connected for movement with said fluid applying means to measure the volume of the material in terms of volume of fluid applied to the flexible member and wherein one of the walls is of a sleeve shaped configuration, the inner peripheral edge of the last mentioned wall has a beveled edge thereon and wherein said sleeve is operably connected for sliding up and about the periphery of a carton located in said chamber containing the material.

3. An apparatus to measure the volume of a deformable material while a uniform pressure is being applied to the material, comprising a chamber, said chamber having walls defining a fixed volume adapted to receive said material, a flexible member forming an internal wall of the chamber adjacent the material, means for applying a fluid under a preselected pressure to one side of the flexible member to bring the flexible member into compressible contact with the material to uniformly compress the material into a compact state, an indicator operably connected for movement with said fluid applying means a measure the volume of the material in terms of volume of fluid applied to the flexible member and wherein a regulating unit is employed to release the pressure of the fluid acting on the flexible member and a means is employed to exhaust air from the material while the flexible member is compressing the material and to supply a source of air under pressure along the surface of the flexible member that is in contact with the material to separate the material from the flexible member after the flexible member has compressed the material.

4. An apparatus to measure the volume of a deformable material while a uniform pressure is being applied to the material, comprising a chamber, said chamber having walls defining a fixed volume adapted to receive said material, a flexible member forming an internal wall of the chamber adjacent the material, means for applying a fluid under a preselected pressure to one side of the flexible member to bring the flexible member into compressible contact with the material to uniformly compress the material into a compact state, an indicator operably connected for movement with said fluid applying means to measure the volume of the material in terms of volume of fluid applied to the flexible member and wherein the chamber has a first stationary wall to support the material thereon, a second stationary wall to support the periphery of said flexible member thereon, a third wall operably connected for alternate movement into a position about the material when the fluid is applied to the flexible member to compress the material and moved into a displaced position with respect to the material after the material has been compressed.

5. An apparatus to measure the volume of a deformable material while a uniform pressure is being applied to the material, comprising a chamber, said chamber having walls defining a fixed volume adapted to receive said material, a flexible member forming an internal wall of the chamber adjacent the material, means for applying a fluid under a preselected pressure to one side of the flexible member to bring the flexible member into compressible contact with the material to uniformly compress the material into a compact state, an indicator operably connected for movement with said fluid applying means to measure the volume of the material in terms of volume of fluid applied to the flexible member and wherein a power actuating means is employed to alternately move a movable wall of the chamber into a position surrounding the material wherein the material is inaccessible when the fluid is applied under pressure to the flexible member and into a position that is spaced away from the material wherein the material is accessible.

References Cited

UNITED STATES PATENTS

| 2,270,505 | 1/1942 | Burleson | 73—149 |
| 2,667,782 | 2/1942 | Shea | 73—149 |
| 2,924,096 | 2/1960 | Humphres | 73—149 |
| 3,309,912 | 3/1967 | Boland et al. | 73—38 |
| 3,348,395 | 10/1967 | Orr et al. | 73—38 |
| 3,402,602 | 9/1968 | De Castelet | 73—149 |

LOUIS R. PRINCE, Primary Examiner

WILLIAM A. HENRY II, Assistant Examiner